(12) United States Patent
Shinojima et al.

(10) Patent No.: US 9,121,501 B2
(45) Date of Patent: Sep. 1, 2015

(54) CONTINUOUSLY VARIABLE TRANSMISSION DEVICE

(75) Inventors: Takumi Shinojima, Kanagawa (JP); Hiromasa Nakamura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 36 days.

(21) Appl. No.: 13/977,989

(22) PCT Filed: Jan. 12, 2012

(86) PCT No.: PCT/JP2012/050474
§ 371 (c)(1),
(2), (4) Date: Aug. 7, 2013

(87) PCT Pub. No.: WO2012/096340
PCT Pub. Date: Jul. 19, 2012

(65) Prior Publication Data
US 2013/0311056 A1  Nov. 21, 2013

(30) Foreign Application Priority Data

Jan. 14, 2011 (JP) .................................. 2011-005621

(51) Int. Cl.
*F16H 61/66* (2006.01)
*F16H 61/30* (2006.01)
(Continued)

(52) U.S. Cl.
CPC ............ *F16H 61/66* (2013.01); *F16H 61/6648* (2013.01); *F16H 59/40* (2013.01); *F16H 2059/366* (2013.01); *F16H 2061/0087* (2013.01)

(58) Field of Classification Search
CPC .......... F16H 61/66; F16H 61/30; F16H 37/02
USPC .............................................. 701/58; 475/46
See application file for complete search history.

(56) References Cited

U.S. PATENT DOCUMENTS 6,047,692 A * 4/2000 Toyoda .......................... 123/698
7,195,576 B2 * 3/2007 Toyoda et al. ................. 475/216
(Continued)

FOREIGN PATENT DOCUMENTS

DE 102004017505 12/2004
JP 11230324 A 8/1999
(Continued)

OTHER PUBLICATIONS

"Toroidal CVT", Hirohisa Tanaka, Corona Publishing Co., Ltd. (Jul. 13, 2000) with partial English translation.
(Continued)

*Primary Examiner* — Calvin Cheung
*Assistant Examiner* — Martin Weeks
(74) *Attorney, Agent, or Firm* — Katten Muchin Rosenman LLP (57) ABSTRACT

Construction is achieved that is capable of ensuring reliability of a learned value for a position of an adjustment member 24 which becomes the criterion for the transmission gear ratio control of a toroidal continuously variable transmission 4. As conditions for allowing learning of a controller 11 that controls the adjustment member 24, in which the controller 11 adjusts the transmission gear ratio of the toroidal continuously variable transmission 4 to a state in which the rotation speed of an output shaft 14 becomes "0", learns and saves in memory the position of the adjustment member 24 in this state as the position in which the output shaft 14 is stopped while an input shaft 3 is rotated as is, the controller 11 determining whether or not the engine 1 rpm is unstable, and prohibiting execution of this learning control if the engine 1 rpm is determined as being unstable due to the engine 1 rpm fluctuating greater than the normal amount of fluctuation during idling or the like, are included.

3 Claims, 6 Drawing Sheets

(51) Int. Cl.
*F16H 37/02* (2006.01)
*F16H 61/664* (2006.01)
*F16H 61/00* (2006.01)
*F16H 59/40* (2006.01)
*F16H 59/36* (2006.01)

(56) References Cited

U.S. PATENT DOCUMENTS

2004/0204284 A1   10/2004  Inoue et al.
2007/0275810 A1*  11/2007  Sinojima et al. ............... 475/216
2009/0247363 A1*  10/2009  Nagami et al. ................ 477/181
2009/0248264 A1*  10/2009  Kubo .............................. 701/58
2010/0167871 A1*   7/2010  Inagaki et al. ..................... 477/5

FOREIGN PATENT DOCUMENTS

JP     2001317601     11/2001
JP     2003307266     10/2003
JP     2004308853 A   11/2004
JP     2005233377 A    9/2005

OTHER PUBLICATIONS

International Search Report and Written Opinion dated Mar. 27, 2012 from the corresponding PCT/JP2012/050474.

* cited by examiner

CONTINUOUSLY VARIABLE TRANSMISSION DEVICE

TECHNICAL FIELD

The present invention relates to the improvement of a continuously variable transmission device in which a toroidal continuously variable transmission is assembled and that is used as an automatic transmission device of an automobile, an automatic transmission device of construction equipment, an automatic transmission device for an electric generator that is used in aircraft and the like.

BACKGROUND ART

Toroidal continuously variable transmissions that are used as automatic transmissions for automobiles are disclosed in many publications such as JP 2001-317601 (A) and "Toroidal CVT", Hirohisa Tanaka, Corona Publishing Co., Ltd. (Jul. 13, 2000), and such transmissions are well known and are partially being put into use. This kind of toroidal continuously variable transmission includes an input-side disk and an output-side disk that are such that the side surfaces in the axial direction thereof that face each other are toroid shaped curved surfaces, and a plurality of power rollers that is held between these disks. During operation, the rotation of the input-side disk is transmitted to the output-side disk by way of the power rollers. These power rollers are supported by support members such as trunnions so as to be able to rotate freely, and these support members are supported so as to be able to freely pivot and displace around pivot shafts that are located offset from the center axis of the input-side and output-side disks such that the pivot shafts and the center axis do not lie in the same plane. When changing the transmission gear ratio between the input-side and output-side disks, a hydraulic actuator causes the support members to displace in the axial direction of the pivot shafts. Supply and discharge of hydraulic oil to and from this actuator is controlled by a control valve, however, at the same time, the movement of the support members is fed back to the control valve.

When the support members are caused to displace in the axial direction of the pivot shafts based on the supply and discharge of hydraulic oil to and from the actuator, the direction of the force in the tangential direction that acts at the areas of contact (traction sections) between the circumferential surfaces of the power rollers and the side surfaces of the input-side and output-side disks changes, and side slipping occurs in the areas of rolling contact. As the direction of this force changes, each of the support members pivots (inclines) around the respective pivot shaft, and the locations of contact between the circumferential surfaces of the power rollers and the side surfaces of the input-side and output-side disks change. When the circumferential surfaces of these power rollers come in rolling contact with the portion of the input-side disk that is near the outside in the radial direction and the portion of the output-side disk that is near the inside in the radial direction, the transmission gear ratio between the input-side and output-side disks is on the accelerating side. On the other hand, when the circumferential surfaces of these power rollers come in rolling contact with the portion of the input-side disk that is near the inside in the radial direction and the portion of the output-side disk that is near the outside in the radial direction, the transmission gear ratio between the input-side and output-side disks is on the decelerating side.

When this kind of toroidal continuously variable transmission device is assembled in an automatic transmission of an automobile, construction in which the continuously variable transmission is combined with a differential gear unit such as a planetary gear mechanism has been proposed. JP 2003-307266 (A) discloses a continuously variable transmission device in which the input shaft is rotated in one direction, and the rotating state of the output shaft is switched between a forward rotating state and a reverse rotating state with the stopped state (so-called gear-neutral state) in between. In the case of this kind of continuously variable transmission device, in the so-called low-speed mode state, the transmission gear ratio of the overall continuously variable transmission device changes to become infinitely large. In other words, by adjusting the transmission gear ratio of the toroidal continuously variable transmission, while the input shaft remains in a state of rotating in a single direction, the rotating state of the output shaft can be changed between a forward rotating state and reverse rotating state with a stopped state in between. In the case of a continuously variable transmission device that is capable of achieving an infinitely large transmission gear ratio, the transmission gear ratio of a toroidal continuously variable transmission is such that near a value where it is possible to achieve a stopped state of the output shaft (geared neutral point, GN point), the state of the power that is transmitted to the output shaft greatly changes even when this transmission gear ratio is changed only a little. Therefore, control of the transmission gear ratio of a toroidal continuously variable transmission must be performed with high precision.

For example, when the automobile is in the stopped state and the shift lever is moved from a non-moving state such as the P range (parking position) or N range (neutral position) to a moving state such as the D range (normal forward position), L range (high drive forward position) or R range (reverse position), a suitable driving force in the forward or reverse direction is quickly generated and it is necessary to keep the vehicle in the stopped state by a braking force caused by operating the brake pedal. Therefore, in a state in which the shift lever has selected a non-moving state, the transmission gear ratio of a toroidal continuously variable transmission must be strictly controlled at a value at which it is possible to achieve a state of an infinitely large transmission gear ratio. Supposing that the transmission gear ratio of a toroidal continuously variable transmission shifts a large amount from a value at which it is possible to achieve an infinitely large transmission gear ratio, and the shift lever has selected a moving state, there is a possibility that a driving force that is greater than anticipated (creep force) will be transmitted and the vehicle will begin to move, or that a driving force in a direction opposite that intended by the operator will be transmitted.

On the other hand, there is a large number of parts assembled in a toroidal continuously variable transmission, and the dimensional precision and assembly precision of many of those parts have an effect on the transmission gear ratio of the toroidal continuously variable transmission. Therefore, it is feasible that individual differences will occur in the transmission gear ratio of toroidal continuously variable transmissions that are capable of achieving a state of an infinitely large transmission gear ratio that is found through design calculation. Moreover, it is also feasible that the characteristics of a transmission gear ratio of a toroidal continuously variable transmission that is capable of a state of an infinitely large transmission gear ratio will change due to changes over time of the components that are used for long periods of time (slight plastic deformation).

On the other hand, JP 2004-308853 (A) discloses giving a learning function to a controller for learning the step position of a stepping motor, in which with the shift lever selecting a non-moving state as a condition, the output shaft is stopped with the input shaft rotating as is. More specifically, with the shift lever selecting a non-moving state as a condition, the rpm of the input-side disk and the rpm of the output-side disk of a toroidal continuously variable transmission are detected by respective rotation sensors. The controller finds the rotational speed of the output shaft in a non-moving state based on the actual transmission gear ratio that is obtained from the rotational speeds of the input-side disk and output-side disk (rotational speed of the input-side disk/rotational speed of the output side disk), and the transmission gear ratio of a planetary gear transmission. The controller then adjusts the transmission gear ratio of the toroidal continuously variable transmission by adjusting the step position (driving amount) of the stepping motor so that the rotational speed of the output shaft is "0". The controller learns the step position for the state where the rotational speed of the output shaft is "0", then stores that step position in the controller memory to complete learning control. The controller controls the transmission gear ratio of the toroidal continuously variable transmission with the adjusted step position (learned value) as a reference. As a result, it becomes possible to control the transmission gear ratio with high precision without being affected by individual differences in or changes over time of the components of the toroidal continuously variable transmission.

However, in the case of the control method related to learning the step position that was conventionally considered, there is a possibility that when the engine rotational speed fluctuates, and the rotating state of the input-side disk and output-side disk that are used for learning the step position becomes unstable, the step position will not be accurately learned. For example, in a state where the operator continuously steps on the accelerator pedal and releases the accelerator pedal (pumps the accelerator pedal), or a state where the amount that the accelerator pedal is pressed is changed (increased or decreased), or a state immediately after releasing the accelerator pedal, the engine rotational speed fluctuates even when the shift lever has selected a non-moving state. When the engine rotational speed fluctuates in this way, the actual transmission gear ratio of the toroidal continuously variable transmission does not change, however, there is a possibility that the calculated transmission gear ratio of the toroidal continuously variable transmission, which is calculated by the controller from the rotational speeds of the input-side disk and output-side disk will change or become unstable due to the detection timing of the sensor for detecting the rotational speeds of the input-side disk and output-side disk and the control period (detecting period of rotational speed) of the controller (engine control unit, ECU). Therefore, there is a possibility that the time (learning time) required for the transmission gear ratio of the toroidal continuously variable transmission to be adjusted to a value (range) that can achieve a state of an infinitely large transmission gear ratio will become long, or that there will be deviation in the learned valued for the step position. As a result, with the step position of the stepping motor shifted from the proper position for stopping the output shaft, there is a possibility that control of the transmission gear ratio will start, and the feeling of shifting is lost, or in the worst case, there is also a possibility that the vehicle will move in a direction opposite from the direction selected by the shift lever position, so in order to prevent the occurrence of such a condition, it is necessary to have a separate failsafe mechanism. However, even where there is such a failsafe mechanism, without performing backup control when the engine rotational speed becomes unstable, it is difficult to sufficiently ensure reliability of the learned value for the step position of the stepping motor of this kind of continuously variable transmission device.

RELATED LITERATURE

Patent Literature

[Patent Literature 1] JP 2001-317601 (A)
[Patent Literature 2] JP 2003-307266 (A)
[Patent Literature 3] JP 2004-308853 (A)

Non-Patent Literature

[Non-patent Literature 1] "Toroidal CVT", Hirohisa Tanaka, Corona Publishing Co., Ltd. (Jul. 13, 2000)

SUMMARY OF THE INVENTION

Problem to be Solved by the Invention

In consideration of the situation described above, it is the object of the present invention to achieve construction of a continuously variable transmission device in which a toroidal continuously variable transmission is assembled that is capable of ensuring reliability of a learned value for a position of an adjustment member which becomes the criterion for the control of the transmission gear ratio of the toroidal continuously variable transmission device.

Means for Solving the Problems

The continuously variable transmission of the present invention has: an input shaft, an output shaft, a toroidal continuously variable transmission, a differential gear unit and a controller. The input shaft is a shaft to which engine output is inputted. The power that is transmitted to the input shaft is transmitted to the output shaft by way of the toroidal continuously variable transmission and the differential gear unit.

The toroidal continuously variable transmission, has: an input-side disk that is rotated and driven by the input shaft; an output-side disk that is concentric with the input-side disk and that is supported so as to be able to rotate freely with respect to the input-side disk; a plurality of power rollers that is held between the input-side disk and the output-side disk; a plurality of support members that supports the power rollers so as to be able to roll freely; an actuator that changes the transmission gear ratio between the input-side disk and the output-side disk by causing the support members to displace; a control unit that has an adjustment member that controls the direction and amount of displacement of the actuator in order to adjust the transmission gear ratio to a desired value; an input-side rotation sensor for detecting the rotational speed of the input-side disk, and an output-side rotation sensor for detecting the rotational speed of the output-side disk.

The differential gear unit has a first input section that has a plurality of gears and that is rotated and driven by the input shaft along with the input-side disk; and a second input section that is connected to the output-side disk; and takes the rotation according to the speed difference between the first and second input sections, and transmits that rotation to the output shaft.

The controller is for controlling the change in the transmission gear ratio of the toroidal continuously variable transmission, and includes an engine control unit (ECU) and the like; and has:
 a first function that, by adjusting the transmission gear ratio of the toroidal continuously variable transmission and changing the relative displacement speed of the plurality of gears, converts the rotational state of the output shaft to forward rotation or reverse rotation with the stopped state in between while the input shaft is being rotated as is in one direction;

a second function of calculating the transmission gear ratio of the toroidal continuously variable transmission from the rotational speed of the input-side disk that is found from the input-side rotation sensor, and the rotational speed of the output-side disk that is found from the output-side rotation sensor; and a third function of performing learning control that, with satisfying specified conditions for allowing learning as a condition, adjusts the transmission gear ratio of the toroidal continuously variable transmission to a state where the rotational speed of the output shaft becomes "0", and then learns and stores the position of the adjustment member in this state as the position where the output shaft is stopped while the input shaft is rotating as is.

Particularly, in the continuously variable transmission device of the present invention, as the conditions for allowing learning for executing the learning control by the third function, the controller determines whether or not the engine rotational speed is unstable, and when it is determined that the engine rotational speed is unstable, the controller prevents execution of learning control by the third function.

More specifically, the engine rotational speed not fluctuating greater than the normal amount of fluctuation during idling is included in the conditions for allowing learning for executing learning control by the third function.

Additionally or alternatively, the engine rotational speed being lower than a set upper limit rotational speed that was set to a value higher than the target idling rotational speed that is set by the controller is included in the conditions for allowing learning for executing learning control by the third function.

Additionally or alternatively, the opening of an acceleration device being 0% is included in the conditions for allowing learning for executing learning control by the third function.

Preferably, in case that the opening of the acceleration device being 0% is included in the conditions for allowing learning for executing learning control by the third function, passage of predetermined time in a state in which the opening of the acceleration device is 0% which is required for the engine rotational speed to become stable at the idling rotation speed from when the opening of this acceleration device was operated to be 0% is included in the conditions for allowing learning for executing learning control by the third function.

Effect of the Invention

With the present invention, it is possible to effectively prevent the execution of learning of a position of an adjustment member when the engine rotational speed, which affects the rotational speeds of an input-side disk and an output-side disk which are used for calculating the transmission gear ratio of a toroidal continuously variable transmission, is unstable. Therefore, it becomes possible to accurately learn the position of the adjustment member that is able to achieve a state of an infinitely large transmission gear ratio even though there is shifting of the detection timing by rotation sensors for detecting the rotational speeds of the input-side disk and output-side disk, and regardless of the detection period by a controller. As a result, it is possible to ensure the reliability of a learned value for the position of the adjustment member that is found based on a third function of the controller.

Furthermore, by including passage of predetermined time in a state in which the opening of the acceleration device is 0% which is required for the engine rotational speed to become stable at the idling rotation speed from when the opening of this acceleration device was operated to be 0% as one of the conditions for allowing learning for execution learning control by the third function of the controller, it is possible to effectively prevent the execution of learning control in a state in which the engine rotational speed is still fluctuating (decreasing) even though the accelerator opening is 0%, such as in the state immediately after the accelerator pedal has been released, and thus it is possible to further improve the reliability of a learned value for the position of the adjustment member.

MODES FOR CARRYING OUT THE INVENTION

First Example

FIG. 1 to FIG. 4 illustrate a first example of an embodiment of the present invention. In the block diagram in FIG. 1, the thick arrows indicate the power transmission path, the solid lines indicate the hydraulic circuit, and the dashed lines indicate the electric circuit. The continuously variable transmission device of this example, as in a conventional device, basically includes an input shaft 3, an output shaft 14, a toroidal continuously variable transmission 4, a differential gear unit (planetary gear transmission) 12 and a controller 11 for controlling the transmission gear ratio of the toroidal continuously variable transmission 4.

Figure 1:
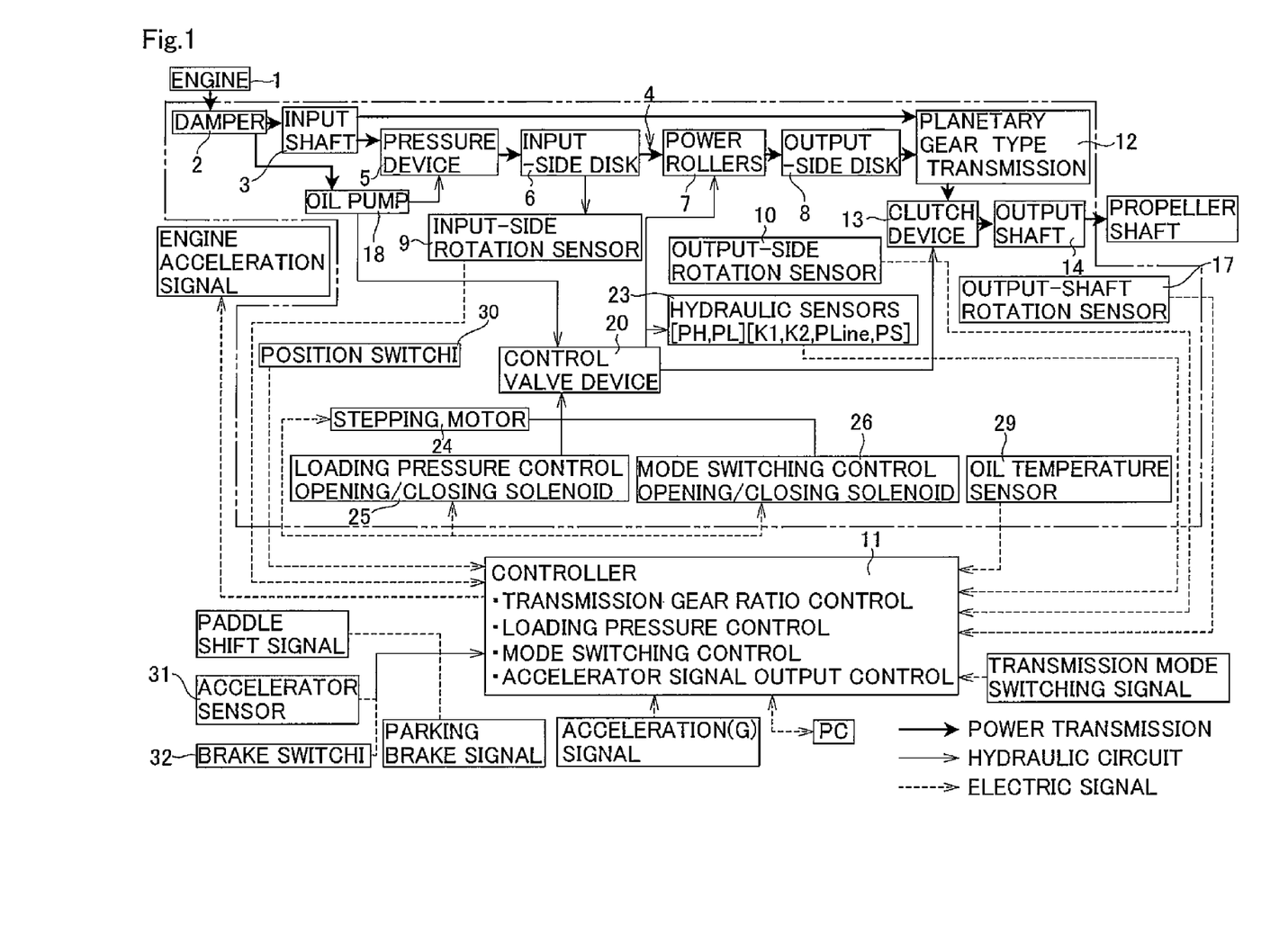
FIG. 1 is a block diagram illustrating a continuously variable device of a first example of an embodiment of the present invention.

The toroidal continuously variable transmission 4 basically includes an input-side disk 6, an output-side disk 8, a plurality of power rollers 7, a plurality of support members such as trunnions (not illustrated in the figure), an actuator 19, a control unit (control valve device) 20, an input-side rotation sensor 9, and an output-side rotation sensor 10. As long as the support member is able to support each of the power rollers 7 so as to be able to roll freely, is able to pivotally displace around a pivot shaft that supports the support members, and is able to displace in the axial direction of this pivot shaft, other well known members such as a carriage can be used.

The input-side disk 6 is rotated and driven by the input shaft 3 together with a first input section of the planetary gear type transmission 12. More specifically, the output from the engine 1 is inputted to the input shaft 3 by way of a damper 2, and power that is transmitted to this input shaft 3 is transmitted to the input-side disk 6 from a hydraulic pressure device 5 of the toroidal continuously variable transmission 4. On the other hand, the output-side disk 8 is supported so as to be concentric with the input-side disk 6 and to be able to freely rotate relative to the input-side disk 6, and is connected to a second input section of the planetary gear type transmission 12. Moreover, each of the power rollers 7 is supported by a trunnion which corresponds to the support member so as to be able to roll freely, and is held between the input-side disk 6 and output-side disk 8. Therefore, power that is transmitted to the input-side disk 6 is transmitted to the output-side disk 8 by way of the power rollers 7. The rotational speed of the input-side disk 6 is measured by the input-side rotation sensor 9, and the rotational speed of the output-side disk 8 is measured by the output-side rotation sensor 10, and by inputting the results to the controller 11, the transmission gear ratio between the input-side disk 6 and the output-side disk 8 is calculated.

Furthermore, when the actuator 19 is a typical hydraulic actuator, the actuator 19 changes the transmission gear ratio between the input-side disk 6 and the output-side disk 8 by causing the trunnions (not illustrated in the figure) to displace in the axial direction of the pivot shafts (not illustrated in the figure) based on the supply state or discharge state of hydraulic oil. The control valve device 20, which is a control unit, controls the displacement direction and displacement amount of the actuator 19 in order that the transmission gear ratio between the input-side disk 6 and the output-side disk 8 becomes a desired value, and comprises an adjustment member (stepping motor 24), a loading pressure control opening/closing solenoid 25, a mode switching control opening/closing solenoid 26, and a control valve device (control valve 21) that switches the operating state according to these, and the like. The adjustment member means a member that is driven by a control signal from the controller 11, and changes (adjusts) the switched state of the control valve 21 of the control unit; where in this example, a stepping motor 24 is used as the adjustment member, however it is also possible to use a servo motor as the adjustment member.

The planetary gear transmission 12, which is a differential gear unit, is a combination of a plurality of gears, and includes a first input unit to which power that is transmitted to the input shaft 3 is directly transmitted by being rotated and driven by the input shaft 3, and a second input unit that is connected to the output-side disk 8 of the toroidal continuously variable transmission 4 and to which power that is transmitted to the input shaft 3 is transmitted by way of the toroidal continuously variable transmission 4. The differential component (rotation due to the speed difference between the first and second input sections) of the members of the planetary gear transmission 12 is output to the output shaft 14 by way of a clutch device 13. The differential unit of the present invention can be either a single pinion type or double pinion type, and one planetary gear type transmission can be used alone, or a combination of a plurality of planetary gear transmissions can be used. Moreover, in this example, an output shaft rotation sensor 17 detects the rotational speed of the output shaft 14, and enables a fail-safe for determining whether or not there is trouble in the input-side rotation sensor 9 and output-side rotation sensor 10.

Figure 2:
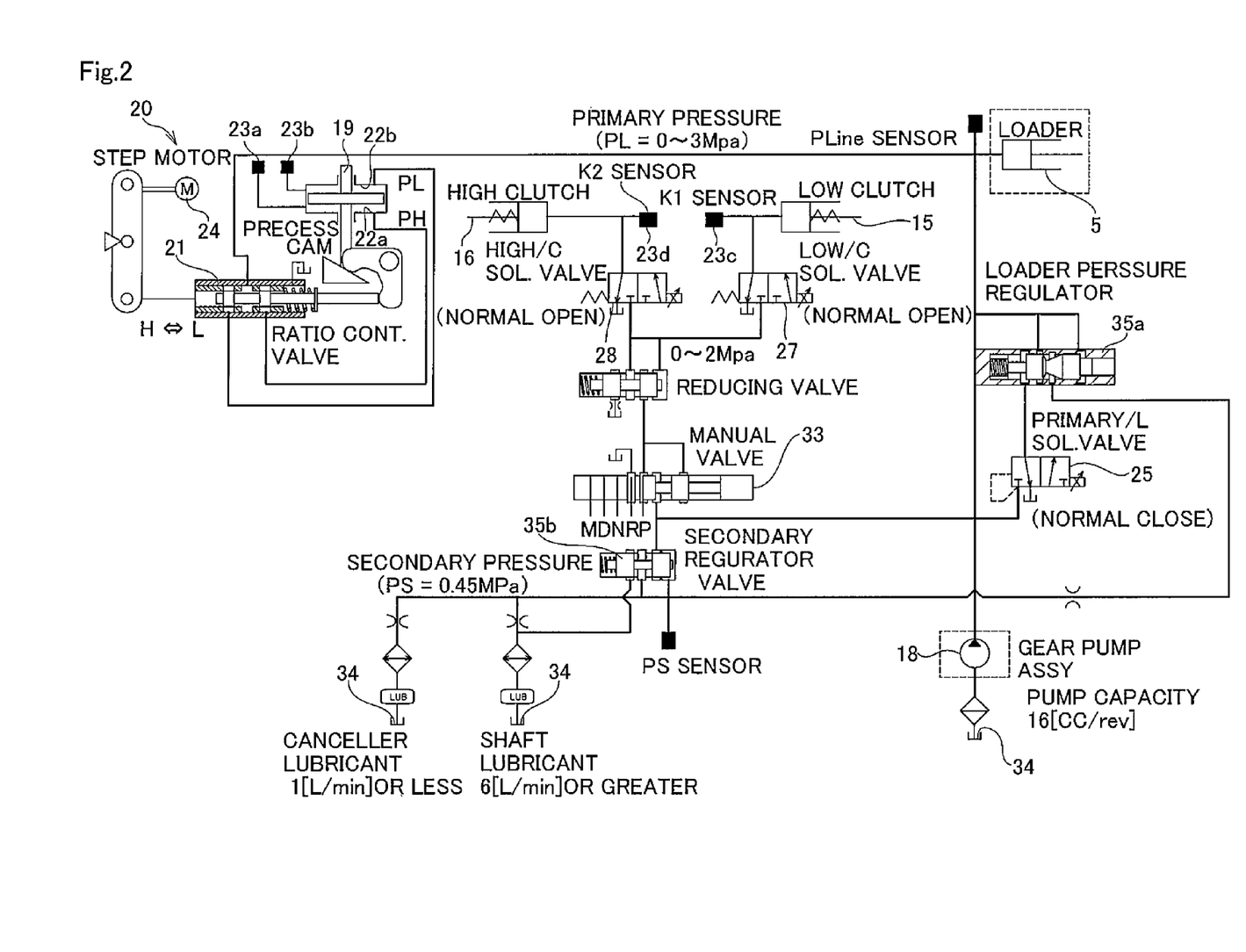
FIG. 2 is a hydraulic circuit diagram illustrating a mechanism for adjusting the transmission gear ratio of a toroidal continuously variable transmission that is assembled in the continuously variable transmission device of the first example of an embodiment of the present invention.

On the other hand, the power that is extracted from the damper 2 drives the oil pump 18, and the hydraulic oil that is discharged from this oil pump 18 is freely fed to the pressure device 5, and control valve device 20, which is a control unit for controlling the displacement amount of the actuator 19 (see FIG. 2). The control valve 21 of the control valve device 20 (see FIG. 2) controls the supply of hydraulic oil to and discharge of hydraulic oil from the actuator 19. The oil pressure in a pair of hydraulic oil chambers 22a, 22b (see FIG. 2) provided in the actuator 19 is detected by a hydraulic sensor 23 (in FIG. 2, this is illustrated as a pair of hydraulic sensors 23a, 23b), and detection signals from the hydraulic sensor 23 are inputted to the controller 11. The controller 11 calculates the torque (passing torque) that passes through the toroidal continuously variable transmission 4 based on the signals from the hydraulic sensor 23 (hydraulic sensors 23a, 23b).

More specifically, the operating state of the control valve device 20 is switched by the stepping motor 24, which is the driving member (adjustment member) of the control valve 21, the loading pressure control opening/closing solenoid 25, and mode switching opening/closing solenoid 26 (low-speed clutch solenoid 27 and high-speed clutch solenoid 28 in FIG. 2). The operating states of the stepping motor 24, loading pressure control opening/closing solenoid 25 and mode switching opening/closing solenoid 26 are switched based on control signals from the controller 11.

The controller 11 includes a microcomputer such as an engine control unit (ECU), and in addition to signals from the input-side rotation sensor 9, output-side rotation sensor 10, output-shaft rotation sensor 17 and hydraulic sensor 23, a detection signal from an oil temperature sensor 29, a position signal from a position switch 30, a detection signal from an accelerator sensor 31, a signal from a brake switch 32 and the like are inputted to the controller 11. The oil temperature sensor 29 is a sensor for detecting the temperature of lubrication oil (traction oil) in a casing that houses the continuously variable device. The position switch 30 is a switch for switching the manual hydraulic switching valve 33 (see FIG. 2), and emits a signal that indicates the operating position (selected position) of the shift lever (operation lever) that is provided on the driver's side. The accelerator sensor 31 is a sensor for detecting the opening amount of the accelerator pedal. Furthermore, the brake switch 32 is a switch that detects that the brake pedal has been pressed, and emits a signal that indicates that.

The controller 11, based on signals from the switches and sensors above, transmits control signals to the stepping motor 24, loading pressure control opening/closing solenoid 25 and mode switching control opening/closing solenoid 26, and also transmits a control signal for controlling the engine 1. The controller 11 then controls the transmission gear ratio between the input shaft 3 and output shaft 4, or when stopped or traveling at low speed, controls the torque (passing torque) that passes through the toroidal continuously variable transmission 4 and is applied to the output shaft 14.

FIG. 2 illustrates the hydraulic circuit that controls this kind of continuously variable transmission. In this hydraulic circuit, hydraulic oil that is taken up from an oil reservoir 34 and discharged from an oil pump 18 can be adjusted to a specified pressure by regulator valves 35a, 35b. The adjusted pressure that was adjusted by the regulator valve 35a, which is one of the regulator valves 35a, 35b for adjusting the oil pressure of the oil to be fed to the manual hydraulic switching valve 33 side, can be adjusted based on opening/closing of the loading pressure control opening/closing solenoid 25. The hydraulic oil whose pressure was adjusted by the regulator valves 35a, 35b is fed to the actuator 19 by way of a control valve 21.

This hydraulic oil can be fed to inside a hydraulic chamber of a low-speed clutch 15 or high-speed clutch 16 of a clutch apparatus 13 by way of the manual hydraulic switching valve 33 and a low-speed clutch solenoid 27 or high-speed clutch solenoid 28. The low-speed clutch 15 is connected when a low-speed mode is achieved in which the speed reduction ratio is large (includes an infinitely large transmission gear ratio), and is disconnected when a high-speed mode is achieved that reduces the speed reduction ratio. On the other hand, the high-speed clutch 16 is disconnected when the low-speed mode is achieved, and is connected when the high-speed mode is achieved. Moreover, the supply/discharge state of hydraulic oil to the low-speed clutch 15 or high-speed clutch 16 is detected by the hydraulic sensors 23c, 23d, and detection signals are inputted to the controller 11.

This controller 11 basically has:

(1) a first function of adjusting the transmission gear ratio of the toroidal continuously variable transmission 4, and that, with the input shaft rotating as is in one direction, changes the rotating state of the output shaft to forward direction or reverse direction with a stopped state in between by changing the relative displacement speed between the plurality of gears of the planetary gear transmission 12, which is the differential unit;

(2) a second function of calculating the transmission gear ratio (rotational speed of the input-side disk 6/rotational speed of the output-side disk 8) of the toroidal continuously variable transmission 4 according to the rotational speed of the input-side disk 6 that is found from the input-side rotation sensor 9 and the rotational speed of the output-side disk 8 that is found from the output-side rotation sensor 10; and (3) a third function of performing learning control of learning and storing a position of the adjustment member of the control unit (for example step position of the stepping motor 24) when, with specified conditions for allowing learning satisfied, the transmission gear ratio of the toroidal continuously variable transmission 4 is adjusted to a state where the rotational speed of the output shaft 14 becomes "0" (zero).

Particularly in this example, this controller 11 determines whether or not the rotational speed of the engine 1 is unstable, and when it is determined that the rotational speed is unstable, the controller 11 prevents learning control by the third function, or in other words, learning control for the step position of the stepping motor 24 from being executed. This kind of function of the controller 11 will be explained with reference to the flowchart in FIG. 3. The operation illustrated in the flowchart is repeatedly performed (start→each step→end→start→ . . . ) automatically from when the ignition switch is turned ON until the switch is turned OFF. In other words, in addition to when learning control has not even been executed once (immediately after the ignition switch has been turned ON), the operation illustrated in this flowchart is repeatedly performed during execution of learning control (state of adjusting the step position), and furthermore after learning control is completed (after learning of the step position that can stop the output shaft 14 has been performed once).

Figure 3:
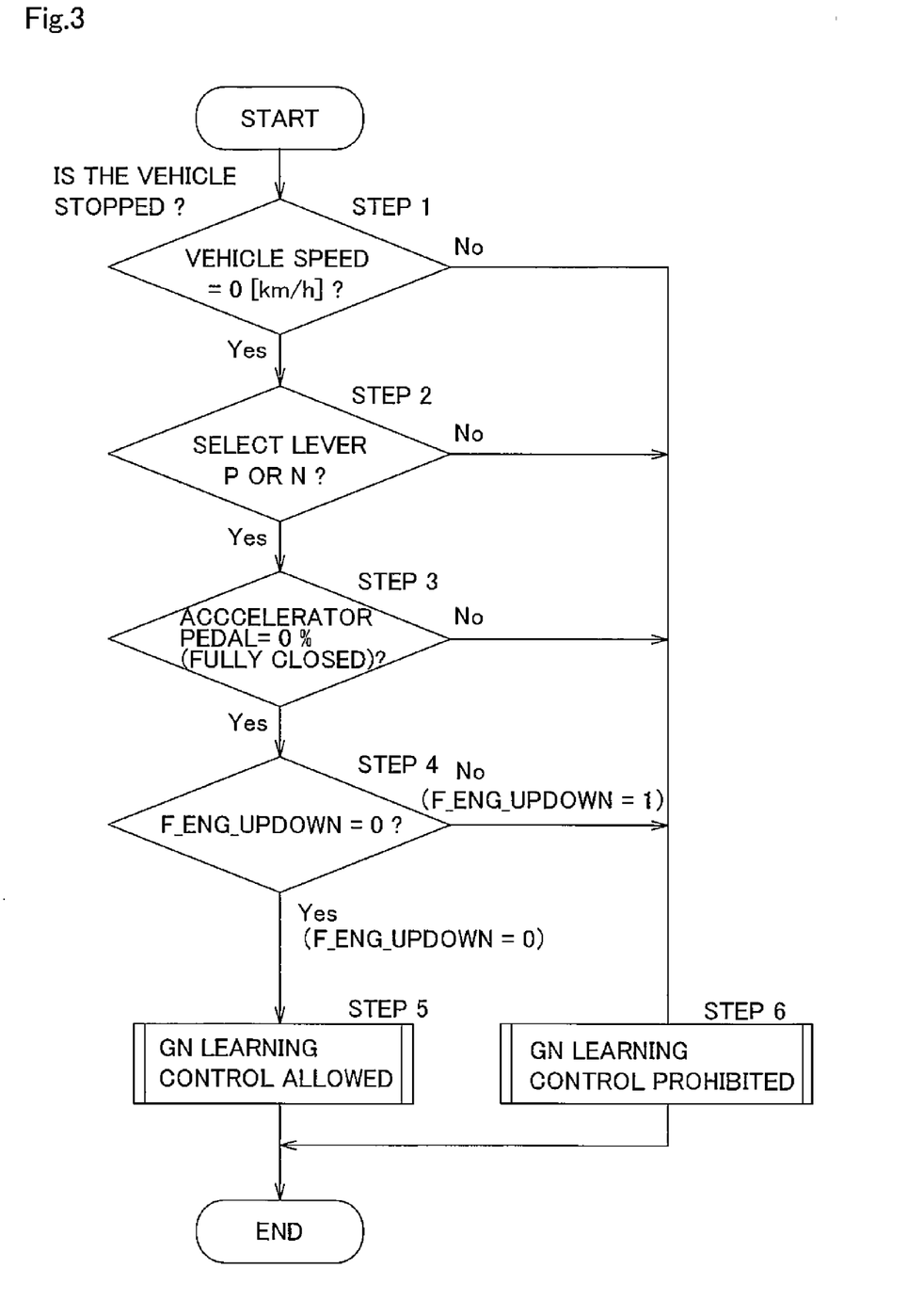
FIG. 3 is a flowchart illustrating the operation that is characteristic of the first example of an embodiment of the present invention.

First, the controller 11, in step 1, determines whether or not the traveling speed of the vehicle is "0". This determination is performed based on a signal from the output-shaft rotation sensor 17, or from a speed sensor (not illustrated in the figure). Processing advances to step 6 without advancing to the next step 2 except when the traveling speed of the vehicle is "0".

On the other hand, when the traveling speed of the vehicle is "0", the controller 11 next advances to step 2, and determines whether or not a non-moving state is selected. This determination is performed based on a signal from the position switch 30. When the operation position of the shift lever that is provided on the driver's side is in the P range or N range, it is determined based on the signal from the position switch 30 that a non-moving state is selected, otherwise it is determined that a non-moving state is not selected. The controller 11 advances to step 6 that will be described later without advancing to the next step 3 except when a non-moving state is selected.

On the other hand, when a non-moving state is selected, the controller 11 next advances to step 3, and determines whether or not the accelerator pedal is in the fully closed state. This determination is performed based on a signal from the accelerator sensor 31. When the accelerator pedal opening is 0%, it is determined that the accelerator pedal is fully closed, otherwise it is determined that the accelerator pedal is not fully closed. The controller 11 advances to step 6 that will be described later without advancing to the next step 4 except when the accelerator is fully closed. In this kind of step 3, the state when the accelerator opening is not 0% (when the accelerator pedal is pressed) can be eliminated from being an object of learning control for learning the step position. Accordingly, in addition to the state in which the amount that the accelerator pedal is pressed is changed (increased or decreased) (range A in FIG. 4), the state in which the amount that the accelerator pedal is pressed is constant and the rotational speed of the engine 1 does not fluctuate (or is not likely to fluctuate) (range B in FIG. 4) can also be eliminated from being an object of learning control of the step position. However, even though the accelerator opening is 0%, such as immediately after the accelerator pedal is released, the state in which the rotational speed of the engine 1 decreases (range C in FIG. 4) is not (cannot be) eliminated from being an object of learning control.

In step 3, when it is determined that the accelerator pedal is fully closed, next the controller 11 advances to step 4, and determines whether or not the rotational speed of the engine is fluctuating greater than a fluctuation amount that normally occurs during idling. More specifically, except for the case in which both conditions 1 and 2 that will be described later are satisfied, the rotational speed of the engine 1 is determined not to be fluctuating greater than a fluctuation amount that normally occurs during idling. Here, "idling" is a state in which the shift lever is selecting a non-moving state such as the P range (parking position) or the N range (neutral position), and the opening of the accelerator (for example, accelerator pedal) is 0% (state in which the accelerator pedal is released). Moreover, a flag, F_ENG_UPDOWN, that expresses the amount of fluctuation is taken to be "0" (F_ENG_UPDOWN=0), and the controller 11 advances to the next step 5.

On the other hand, when both conditions 1 and 2 are satisfied, the rotational speed of the engine 1 is determined to be "fluctuating greater than the amount of normal fluctuation" during idling. The flag F_ENG_UPDOWN is then taken to be (F_ENG_UPDOWN=1), and the controller 11 advances to step 6. This kind of determination work is performed based on a signal from the input-side rotation sensor 9 (when the rotation of the crankshaft of the engine 1 is transmitted as is to the input shaft 3 and input-side disk 6), or based on a signal for displaying the rotational speed of the engine on a tachometer on the driver's side.

Condition 1: The rotational speed of the engine is fluctuating greater than a specified idling speed fluctuation range.

Condition 2: The fluctuation frequency of the rotational speed of the engine is equal to or greater than a specified value (fluctuation period is equal to or less than a specified value).

In condition 1, when the specified idling speed in catalog value which varies depending on type of engine is 800 to 850 rpm, the controller 11 determines whether or not the rotational speed of the engine 1 is fluctuating greater than a fluctuation range of 50 rpm, which is difference between the maximum rotational speed and minimum rotational speed.

Figure 4:
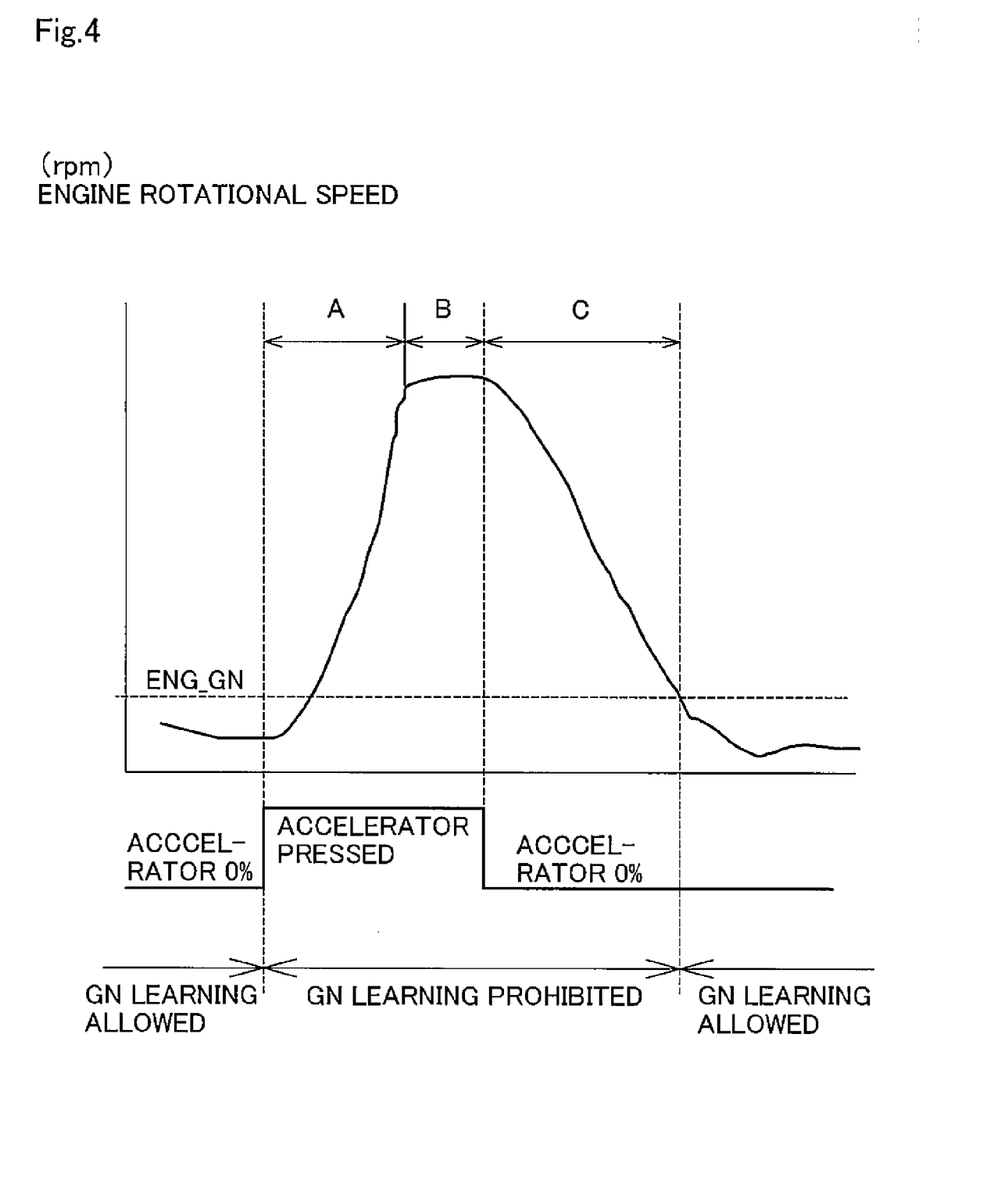
FIG. 4 is a drawing illustrating the relationship between the engine rotational speed, accelerator open/closed state, and upper limit rotational speed for explaining the learning state for learning a step position in the first example of an embodiment of the present invention.

Moreover, in condition 2, the specified value above, which is the tuning value, is set to 2 Hz, for example, according to the temperature of the traction oil that is found from the oil temperature sensor 29 at that time, and the type the engine, and the controller 11 determines whether or not the fluctuation frequency of the rotational speed of the engine 1 is equal to or greater than 2 Hz. When the fluctuation frequency is small (the fluctuation period is long), and the fluctuation is slow, the fluctuation in rotational speed is not easily affected by shifting of the detection timing or by the control period. Therefore, the specified values above are set from the aspect of whether or not the fluctuation in rotational speed is easily affected by shifting of the detection timing by the rotation sensor 9, 10 or by the control period. In this way, in step 4, the state in which the engine rotational speed in range C illustrated in FIG. 4, is fluctuating greater than the fluctuation amount during normal idling, which could not be eliminated from being an object of learning control in step 3, and furthermore, the state in which the fluctuation frequency of the engine rotational speed is easily affected by shifting in the detection timing or by the control period, are also eliminated from being an object of learning control.

In step 4, when it is determined that the rotational speed of the engine 1 is not fluctuating greater than the normal amount of fluctuation during idling, then in step 5, the controller 11 allows learning control of the step position for achieving a state of an infinitely large transmission gear ratio, and executes learning control. More specifically, by driving the stepping motor 24, the controller 11 adjusts the transmission gear ratio of the toroidal continuously variable transmission 4 within a range of ±α (threshold value) of the transmission gear ratio (geared neutral transmission gear ratio) where the rotational speed of the output shaft 14 is "0". This geared neutral transmission gear ratio is found by calculating the transmission gear ratios of the gears of the planetary gear transmission 12, and is, for example, approximately 1.306. Therefore, the controller 11 sets the threshold value to ±0.01, and adjusts the transmission gear ratio of the toroidal continuously variable transmission 4 to be within the range 1.306±0.01.

In the case of this example, the stepping motor 24 is not driven to a specified step position (set learned value), but rather the step position of the stepping motor 24 is a reference value of transmission gear ratio control where the transmission gear ratio of the toroidal continuously variable transmission 4 is within a range of 1.306±0.01. Therefore, while learning control is being executed, REAL_SMP that indicates the current step position of the stepping motor 24 is fixed at "0" that indicates the reference value (REAL_SMP=0), and the current step position (REAL_SMP) is handled as a reference value for obtaining the state of an infinitely large transmission gear ratio. Moreover, there is no position sensor or rotation angle sensor for measuring the stroke position of the output rod of the stepping motor 24.

The work of actually adjusting the transmission gear ratio of the toroidal continuously variable transmission 4 is performed by causing the output rod of the stepping motor 24 to displace while observing the detection signals from the input-side rotation sensor 9 and output-side rotation sensor 10 (rotational speed $N_{ID}$ of the input-side disk 6, rotational speed $N_{OD}$ of the output-side disk 8) (while observing the transmission gear ratio of the toroidal continuously variable transmission 4 that is calculated based on the second function of the controller 11). Then, in order to cause this output rod to displace, the number of steps of the stepping motor is counted in relation to the direction of driving the stepping motor 24. For example, when the stepping motor 24 is driven one step toward the Low side, the value (GN_SMP, initial value 0) that indicates the step position (number of steps) of the stepping motor 24 that is in the progress of being learned is counted up one step (GN_SMP=GN_SMP+1). On the other hand, when the stepping motor 24 is driven one step toward the High side, the value that indicates the step position of the stepping motor 24 that is in the progress of being learned is counted down one step (GN_SMP=GN_SMP−1).

The controller 11, together with determining whether or not the transmission gear ratio of the toroidal continuously variable transmission 4 is adjusted to be within the range 1.306±0.01, determines whether or not that transmission gear ratio falls into that range in a specified amount of time (for example, 3 seconds). When it is determined that the transmission gear ratio of the toroidal continuously variable transmission 4 is adjusted to within the range 1.306±0.01, and that it falls into that range within a specified amount of time, the controller 11 ends learning control and sets a learning complete flag that indicates that learning is completed (F_GN_LEARN=0→1). Moreover, the controller 11 learns the step position (GN_SMP) of the stepping motor 24 at the instant when the transmission gear ratio is adjusted to within the range above as the reference position at which the state of an infinitely large transmission gear ratio is obtained, and stores that step position in the memory of the controller 11 (GN_SMP=REAL_SMP=0). The controller 11 then advances to the end of the process, and returns to the start again.

On the other hand, in step 4 described above, when it is determined that the rotational speed of the engine 1 is not fluctuating greater than the normal amount of fluctuation during idling, then, as in the case when it was determined that the conditions for allowing learning in steps 1 to 3 above are not satisfied, the controller 11 advances to step 6 and prevents (stops) learning control for the step position for achieving the state of an infinitely large transmission gear ratio. The controller 11 then sets a learning incomplete flag that indicates that learning control is not completed (F_GN_LEARN=0), advances to the end, and then returns to the start.

With the continuously variable transmission of this example that has the construction described above and that operates as described above, it is possible to ensure the reliability of the learned value for the step position of the stepping motor 24 that is the reference for controlling the transmission gear ratio of the toroidal continuously variable transmission. In other words, in this example, in step 3, when the accelerator pedal is pressed such that there is a high possibility that the rotational speed of the engine 1 will fluctuate, the state is eliminated from being an object of learning control for the step position, and then in step 4, when, for example, immediately after the accelerator is released, the rotational speed of the engine 1 is fluctuating greater than the normal amount of fluctuation during idling even though the accelerator opening is 0%, the state is eliminated from being an object of learning control for the step position. Consequently, it is possible to effectively prevent executing learning of the step position in a state in which the rotational speed of the engine 1 that affects the rotational speed of the input-side and output-side disks 6, 8 for calculating the transmission gear ratio of the toroidal continuously variable transmission 4 is unstable. Therefore, it is possible to accurately learn the step position where it is possible to achieve a state of an infinitely large transmission gear ratio regardless of whether there is shifting in the timing of detection by the input-side and output-side rotation sensors 9, 10 for detecting the rotational speed of the input-side and output-side disks 6, 8, and regardless of the detection period by the controller 11. As a result, with this example, it is possible to ensure reliability of the learned value of this step position. The other construction and effects, including the first function and section function of the controller 11, are the same as in the continuously variable transmission disclosed in JP 2004-308853 (A).

Second Example

Figure 5:
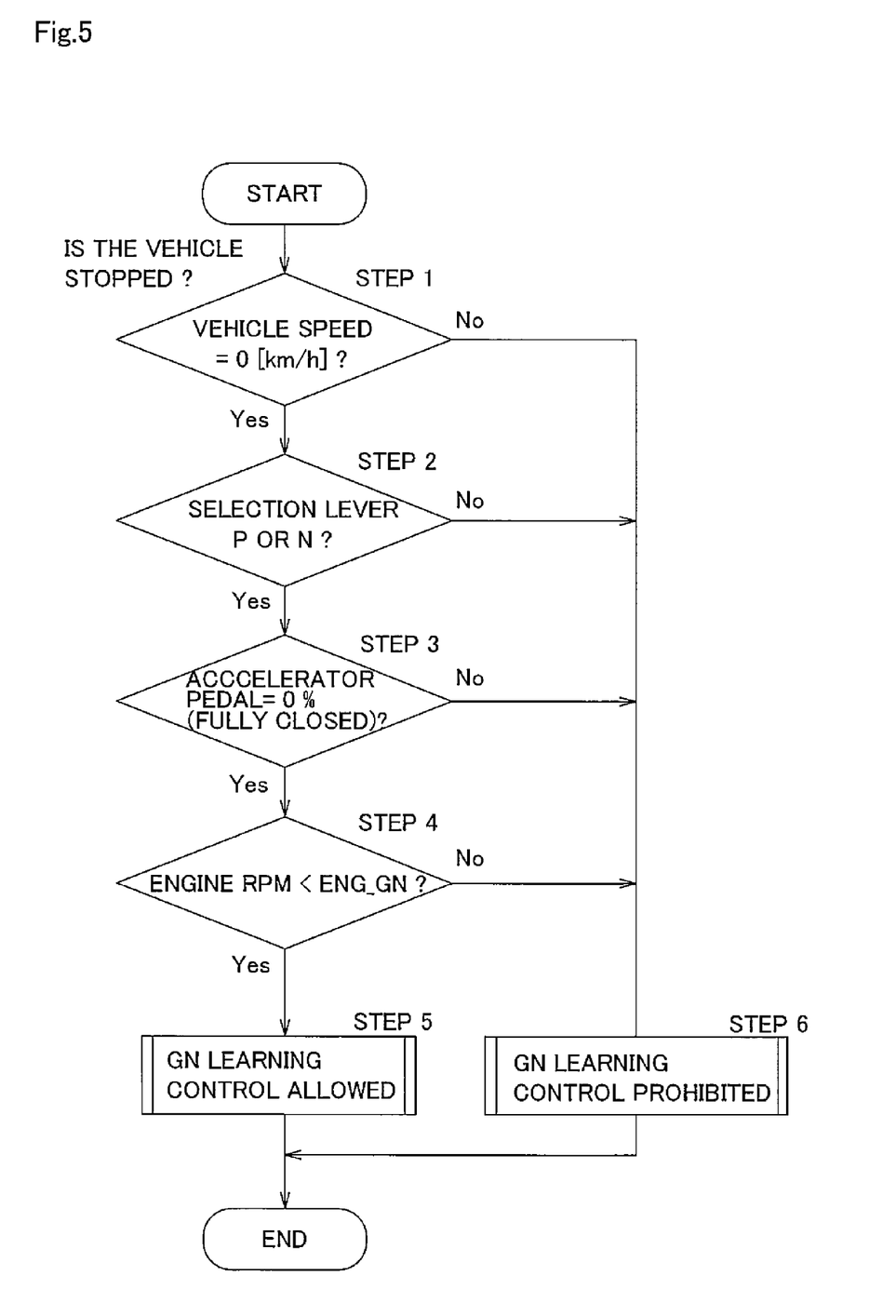
FIG. 5 is a flowchart illustrating the operation that is characteristic of a second example of an embodiment of the present invention.

FIG. 5 illustrates a second example of an embodiment of the present invention. A feature of this example is that the conditions (conditions for allowing learning) for determining whether or not the rotational speed of the engine 1 (see FIG. 1) is stable are different than in the first example of an embodiment. The other construction and effects are the same as in the first example of an embodiment.

In this example as well, as illustrated in the flowchart in FIG. 5, in step 1, the controller 11 determining whether or not the traveling speed of the vehicle is "0", in step 2, determining whether or not a non-moving state is selected, and in step 3, determining whether or not the accelerator pedal is in a fully closed state, are the same as in the first example of an embodiment. Moreover, advancing to step 6 without advancing to the next step except when the respective condition in each step is satisfied is also the same.

In this example, in step 3, when the accelerator pedal is fully closed, the controller 11 advances to the next step 4, and determines whether or not the rotational speed of the engine 1 is lower than an upper limit rotational speed {ENG_GN=target idling speed (TRGET_IDLE)+X} that is set to a value that is higher than the target idling speed that is set by the controller 11. Here, the "target idling speed" is the engine rotational speed that is set by the controller 11 (based on a map or the like) depending on the coolant temperature, intake air temperature, rotating state of auxiliary machinery of the engine and the like, and, in case during warming-up operation, it is set to a value that is higher than during normal operation. Moreover, the amount (value X) that the set upper limit rotational speed (ENG_GN) is greater than the target idling speed (TRGET_IDLE) can be appropriately set (tuning value) based on the engine characteristics and the like. This value X can be set corresponding to a rotational speed value that is a little higher than the target idling speed, through which the engine rotational speed passes during returning to the target idling speed and to which the engine rotational speed reaches within a relatively short time from the high rotation state immediately after the engine is started. More specifically, in the case of a typical normal automobile, the value X can be set to about 300 to 500 rpm. For example, when the value is set to X=400 rpm, the controller 11 determines whether or not the rotational speed of the engine 1 is lower than the rotational speed value of the target idling speed+400 rpm. This determination is performed based on a signal from the input-side rotation sensor 9 (in case that rotation of a crankshaft of the engine 1 is transmitted as is to the input shaft 3 and input-side disk 6), or based on a signal for displaying the engine rotational speed on a tachometer on the driver's side. Except when the rotational speed of the engine 1 is less than the rotational speed value of the target idling speed+400 rpm, the controller 11 advance to step 6 described later without advancing to the next step 5. In this kind of step 4, as illustrated in FIG. 4 that illustrates the relationship between the engine rotational speed and the set upper limit rotational speed (ENG_GN), range C that was not eliminated from being an object of learning control in step 3 (state immediately after the accelerator pedal is released), is eliminated from being an object of learning control.

In step 4, when it is determined that the rotational speed of the engine 1 is lower than the set upper limit rotational speed (ENG_GN), then in the next step 5, the controller 11 allows learning control of the step position for achieving a state of an infinitely large transmission gear ratio, and executes learning control. The detailed method of performing learning control is the same as in the first example of an embodiment described above. On the other hand, in step 4, when it is determined that the rotational speed of the engine 1 is equal to or greater than the upper limit rotational speed (ENG_GN), then in step 6, the controller 11 prohibits learning control of the step position for achieving a state of an infinitely large transmission gear ratio. The controller 11 advances to the end, then returns to the start.

In the case of this example, in step 3, by eliminating the case where the accelerator pedal is pressed such that there is a high possibility that the rotational speed of the engine 1 will fluctuate from being an object of learning control of the step position, and then in step 4, by eliminating the case where the rotational speed of the engine 1 is equal to or greater than a set upper limit rotational speed from being an object of learning control of the step position even though the accelerator opening is 0% such as immediately after the accelerator pedal has been released, the reliability of the learned value of the step position of the stepping motor 24 is ensured in the same way as in the first example of an embodiment.

Third Example

Figure 6:
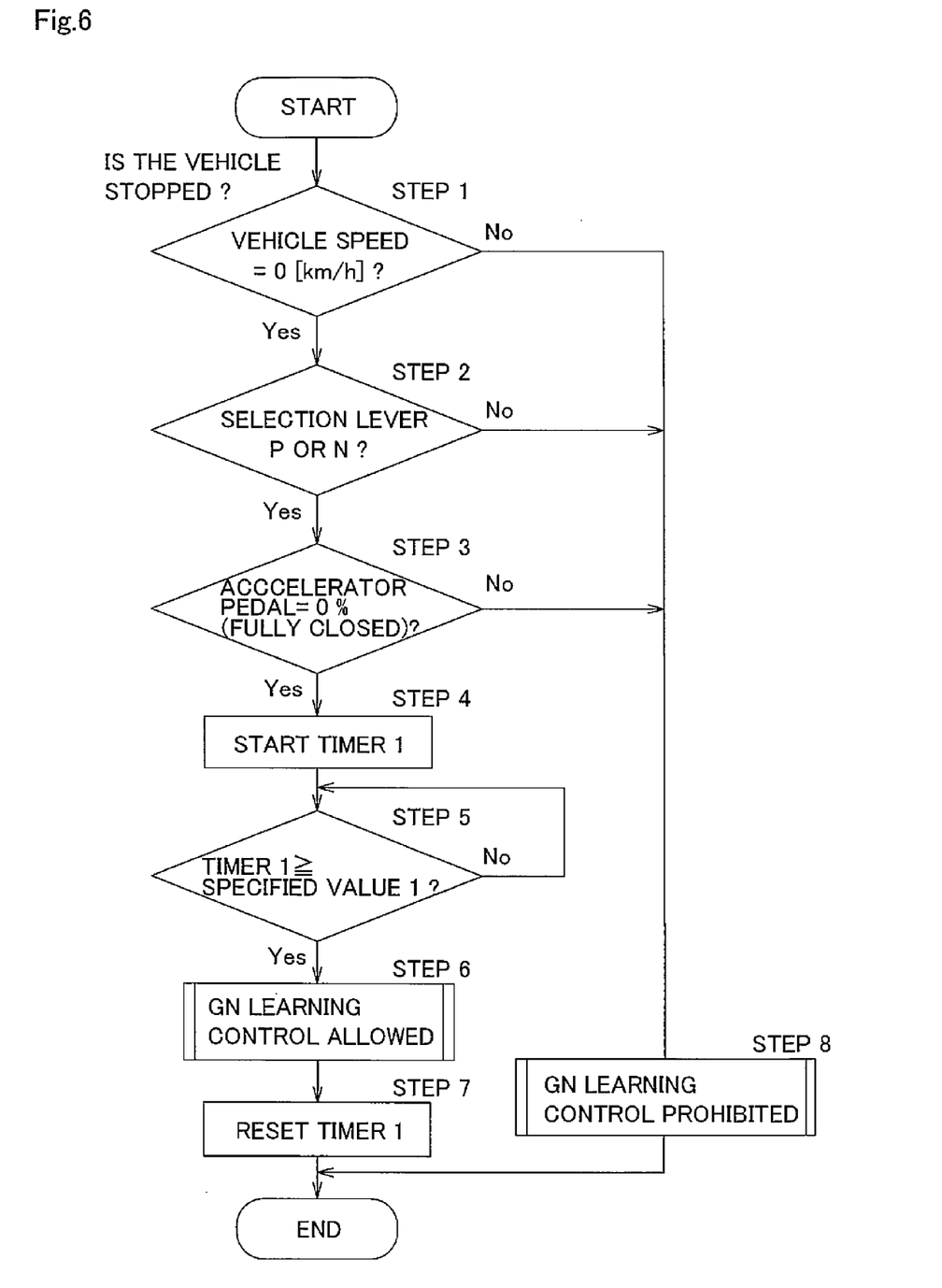
FIG. 6 is a flowchart illustrating the operation that is characteristic of a third example of an embodiment of the present invention.

FIG. 6 illustrates a third example of an embodiment of the present invention. A feature of this example is that the controller 11 has a timer function (see FIG. 1), and the execution of learning control is allowed only when a fully closed state of the accelerator pedal is continued for a specified amount of time required for the engine rotational speed to become stable at the idling speed. Except for the conditions in the engine rotational speed determination in step 4 for allowing learning, the other construction and functions are the same as in the first example of an embodiment.

In this example, as illustrated in the flowchart in FIG. 6, in step 3, when it is determined that the accelerator pedal is fully closed, the controller 11 advances to the next step 4 and starts the timer for counting the amount of time that the accelerator pedal is in the fully closed state (count time=timer 1). Then, the controller 11 advances to the next step 5 and determines whether or not the time of the fully closed state is equal to or has exceeded a specified amount of time that is required for the engine rotational speed to become stable at the idling speed after the accelerator pedal has been released (specified value 1; for example, 3 to 5 seconds). When the time is determined to be equal to or to have exceeded the specified time, the controller 11 then advances to the next step 6, allows learning control of the step position for achieving a state of an infinitely large transmission gear ratio, and executes learning control. The detailed method of learning control is the same as in the first example of an embodiment. After execution of learning control has been allowed, in the next step 7, the controller 11 resets the timer (timer 1=0). The controller 11 advances to the end, then returns to the start.

On the other hand, when it is determined that the time of the fully closed state has not yet exceeded the specified amount of time, then the controller 11 performs determination again without advancing to the next step 6 (repeats the determination of step 5), waits for the time to exceed the specified time, then allows processing to advance to the next step 6. Then, the controller 11 allows learning control and executes learning control. After execution of learning control has been allowed, in the next step 7, the controller 11 resets the timer (timer=0). The controller 11 advances to the end, then returns to the start. In this example as well, when it is determined that the conditions in steps 1 to 3 for allowing learning are not satisfied, then in step 8, the controller 11 prohibits learning control of the step position for achieving a state of an infinitely large transmission gear ratio. The controller 11 advances to the end, then returns to the start.

In this example, execution of learning control is not allowed unless the fully closed state of the accelerator pedal has continued for a time equal to or greater than a specified amount of time required for the engine rotational speed to become stable at the idling speed after the accelerator pedal has been released. Therefore, execution of learning control is effectively prevented in a state in which the rotational speed of the engine 1 is still not fluctuating (has not dropped) (range C in FIG. 4) even though the accelerator opening is 0% such as in the state immediately after the accelerator pedal is released. As a result, with this example, it is possible to further improve the reliability of the learned value of the step position of the stepping motor 24.

INDUSTRIAL APPLICABILITY

The continuously variable transmission device of the present invention in which a toroidal continuously variable transmission is assembled not only can be applied for use in an automatic transmission of an automobile, but can also be widely applied for use in automatic transmissions of other kinds of vehicles, in automatic transmission of construction machinery, in automatic transmissions for generators that can be used in aircraft (fixed wing aircraft, rotary wing aircraft, blimps) and the like.

EXPLANATION OF REFERENCE NUMBERS

1 Engine
2 Damper
3 Input shaft
4 Toroidal continuously variable transmission
5 Pressure device
6 Input-side disk
7 Power roller
8 Output-side disk
9 Input-side rotation sensor
10 Output-side rotation sensor
11 Controller
12 Planetary gear transmission
13 Clutch device
14 Output shaft
15 Low-speed clutch
16 High-speed clutch
17 Output-shaft rotation sensor
18 Oil pump
19 Actuator
20 Control value device
21 Control valve
22a, 22b Hydraulic oil chamber
23, 23a to 23d Hydraulic sensor
24 Stepping motor
25 Loading pressure control opening/closing solenoid
26 Mode switching control opening/closing solenoid
27 Low-speed clutch solenoid
28 High-speed clutch solenoid
29 Oil temperature sensor
30 Position switch
31 Accelerator sensor
32 Brake switch
33 Manual hydraulic switching valve
34 Oil reservoir
35a, 35b Regulator valve

What is claimed is:

1. A continuously variable transmission, comprising: an input shaft; an output shaft; a toroidal continuously variable transmission; a differential gear unit; and a controller, the input shaft being a shaft to which engine output is inputted, the toroidal continuously variable transmission comprising: an input-side disk that is rotated and driven by the input shaft; an output-side disk that is concentric with the input-side disk and that is supported so as to be able to rotate freely with respect to the input-side disk; a plurality of power rollers that is held between the input-side disk and the output-side disk; a plurality of support members that supports the power rollers so as to be able to roll freely; an actuator that changes a transmission gear ratio between the input-side disk and the output-side disk by causing the support members to be displaced; a control unit that has an adjustment member that controls a direction and amount of displacement of the actuator in order to adjust the transmission gear ratio to a desired value; an input-side rotation sensor for detecting a rotational speed of the input-side disk; and an output-side rotation sensor for detecting a rotational speed of the output-side disk, the differential gear unit comprising: a first input section that has a plurality of gears and that is rotated and driven by the input shaft along with the input-side disk; and a second input section that is connected to the output-side disk, taking a rotation according to a speed difference between the first and second input sections, and transmitting the rotation to the output shaft, the controller being for controlling the change in the transmission gear ratio of the toroidal continuously variable transmission; and including:

a first function that, by adjusting the transmission gear ratio of the toroidal continuously variable transmission and changing a relative displacement speed of the plurality of gears, converts a rotational state of the output shaft to forward rotation or reverse rotation with a stopped state in between while the input shaft is being rotated as is in one direction;

a second function of calculating the transmission gear ratio of the toroidal continuously variable transmission from the rotational speed of the input-side disk that is found from the input-side rotation sensor, and the rotational speed of the output-side disk that is found from the output-side rotation sensor; and a third function of performing learning control that, with satisfying specified conditions for allowing learning as a condition, adjusts the transmission gear ratio of the toroidal continuously variable transmission to a state where the rotational speed of the output shaft becomes "0", and then learns and stores a position of the adjustment member in this state as a position where the output shaft is stopped while the input shaft is rotating as is, wherein as the specified conditions for allowing learning for executing the learning control by the third function,
an opening of an acceleration device being 0%;
an engine rotational speed not fluctuating greater than a normal amount of fluctuation during idling; and
the engine rotational speed being lower than a set upper limit rotational speed that was set to a value higher than a target idling speed that is set by the controller; are included, and wherein
when the controller determines that all of the specified conditions are not satisfied, the controller prevents execution of the learning control by the third function.

2. The continuously variable transmission according to claim 1 wherein, in the state in which the opening of the acceleration device is 0%, time from when the opening of the acceleration device was operated to be 0% until the time exceeds a specified amount of time required for the engine rotational speed to become stable at the idling speed is included in the specified conditions for allowing learning for executing learning control by the third function.

3. The continuously variable transmission according to claim 1, wherein the controller determines that the engine rotational speed fluctuates greater than the normal amount of fluctuation during idling, when the engine rotational speed is fluctuates greater than a specified idling speed fluctuation range, or when a fluctuation frequency of the engine rotational speed is equal to or greater than a specified value.

* * * * *